United States Patent Office 3,285,772
Patented Nov. 15, 1966

3,285,772
METHOD OF PRIMING A METAL SURFACE WITH A TERPOLYMER SOLUTION CONTAINING A POLYHYDROXY COMPOUND
Ulrich Rietz and Peter Schmitz, Munich, Germany, and Hermann Unterguggenberger, deceased, late of Munich, Germany, by Louise Unterguggenberger, Roland Unterguggenberger, and Christa Unterguggenberger, heirs, all of Munich, Germany, assignors to Wacker-Chemie G.m.b.H., Munich, Germany, a firm of Germany
No Drawing. Original application Nov. 10, 1960, Ser. No. 68,367. Divided and this application Dec. 16, 1964, Ser. No. 419,629
Claims priority, application Germany, Dec. 30, 1959, W 26,981
6 Claims. (Cl. 117—75)

The present application is a division of copending application Serial No. 68,367, filed November 10, 1960.

It is a common practice to coat metal surfaces with polyvinyl chloride and other film-forming resins in order to protect them, for example, from corrosion or to render them chemically resistant. In order to obtain a good bonding of the coating composition to the metal surface being protected it is essential that a suitably adherent base or prime coat first be applied to the metal surface. Base coating or priming compositions which have been found to be especially suitable for this purpose are those in which the film-forming component is a copolymer of vinyl chloride and vinyl acetate modified with an unsaturated dicarboxylic acid. The final coating composition or finish is then applied by spraying, dipping, roller coating or brushing and in the case of plastisols or organosols comprising a vinyl polymer or copolymer the coated metal surface is then baked to cause the vinyl polymer or copolymer to fuse and to produce a suitably adherent coating.

The above base coating or priming compositions are not suitable, however, for use in the priming or undercoating of metals such as zinc and its alloys, as well as iron and tin plate, which accelerate the thermal decomposition of the vinyl resins and impair the bond. In order to minimize any decomposition of the primer or undercoat in the coating of active surfaces such as zinc and zinc alloy material, for example, it has been the practice either to plate the latter with copper or to phosphatize the surface, or else to control the baking temperature and to maintain the temperature of the subsequently applied surface coating compositions below about 150° C. These methods have proven to be unsatisfactory, however, since they are not only troublesome but in order to produce desirably glossy surface coatings with those coating compositions having a basis of polyvinyl chloride a baking temperature above 180° C. is necessary. Even with the addition of appreciable amounts of the commonly employed inorganic and organic stabilizing agents little noticeable improvement is obtained. Mixed copolymers of vinyl chloride and vinyl acetate modified with maleic acid as well as those containing polycondensate resins while giving excellent adhesion do not permit the use of the higher baking temperatures which are necessary in order to produce coated surfaces exhibiting a high gloss.

It is, therefore, an important object of this invention to provide a new and improved method of coating zinc and zinc-alloy surfaces by priming and undercoating said surfaces with compositions comprising modified copolymers of vinyl chloride and vinyl acetate which are of greatly improved thermal resistance to decomposition and degradation when employed in the priming of zinc and zinc-alloy surfaces and which are entirely suitable for use at baking temperatures higher than hitherto available without undesirable chemical change. Other objects of this invention will appear hereinafter from the following detailed description and the accompanying claims.

It has now been found that improved metal priming or undercoating compositions comprising a copolymer of vinyl chloride and vinyl acetate modified with an unsaturated dicarboxylic acid may be obtained if said priming or undercoating compositions are further modified by incorporating a polyhydroxy compound therein in which said polyhydroxy compound contains at least four available hydroxy groups. This modification, surprisingly enough, results in the formation of primer compositions or undercoatings of substantially increased thermal stability with the result that they may be heated during baking operations to temperaturts of as high as 190° C. and maintained at such temperature for relatively long periods without any apparent discoloration or other change indicative of any decomposition taking place. In accordance with the present invention, which as brought out above involves the addition of a polyhydroxy compound to said copolymer primer compositions, it has been found that metal surfaces comprising zinc and its alloys, for example, surfaces which have been notoriously difficult to prime satisfactorily with suitable adhesion, may now be coated with polyvinyl chloride plastisols without any necessity for limiting or otherwise altering the temperatures or the duration of the baking treatment these coating materials require in order to effect the desired degree of fusion or gel formation in producing the desired surface characteristics.

As some examples of suitable polyhydroxy compounds which may be employed in accordance with the present invention there may be mentioned polyvinyl alcohol, pentaerythritol, and hydroxyethyl-cellulose, it being understood, of course, that in the case of each of these modifying agents they will contain at least four available hydroxy groups.

The amount of said polyhydroxy compound added to the priming composition to obtain the desired heat resistance and stability will normally increase the higher the baking temperature employed and the longer the period of time to which the primer or undercoating composition is exposed to these temperature conditions. In addition, it has been observed that the amount of polyhydroxy compound necessary to produce the desired thermal stability depends also upon the composition of the alloy. Accordingly, it has been found that in order to obtain the desired degree of thermal stability the priming compositions will contain from about 20% to 200% by weight of said polyhydroxy compound, based upon the weight of the polyvinyl copolymer film-forming component in said composition. Preferably, the stabilized primer composition will contain about 85% by weight of the polyhydroxy compound based upon the weight of the polyvinyl copolymer present for optimum results.

These primer compositions are ordinarily formulated by dissolving the unsaturated acid modified vinyl copolymer in a volatile liquid solvent medium together with the polyhydroxy compound and then spraying, dipping or brushing the undercoat on the metal surface. The solvent employed is commonly a mixture of an aliphatic ketone such as methyl ethyl ketone, methyl butyl or isobutyl ketone or methyl amyl ketone with an aromatic solvent such as toluene or xylene.

An enhanced degree of thermal stability is also obtained if not only the priming composition but also the surface coating composition applied over said undercoat which may be a polyvinyl chloride plastisol or organosol, for example, is also modified by the addition of said polyhydroxy compound thereto. Alternatively, the coating composition may also be modified by incorporating therein the usual stabilizing agents such as the organic tin or lead compounds commonly utilized for this purpose in the art. Bodying agents, fillers and pigments well-known in the art may also be incorporated in the coating composition which are applied over the primer.

It is to be understood, of course, that the novel primer compositions of this invention may be employed alone for protecting metal surfaces without any added surface finish coating being applied over the primer. This priming treatment, furthermore, is suitable for the priming of all other metal surfaces and especially those which are subsequently to be exposed to higher temperatures in a fusing or baking step and is not limited to those situations only where a plastisol or organosol surface coating is subsequently applied over the undercoat and baked. In addition, these novel priming compositions serve admirably as a base coating for metal surfaces upon which other bodied and pigmented coating compositions may be applied such as, for example, those surface coatings where the film-forming component is a chlorinated rubber, nitrocellulose or an alkyd resin.

In order further to illustrate this invention but without being limited thereto, the following examples are given:

Example 1

The surfaces of a sheet of iron are mechanically scoured and are then coated with a primer of the following composition:

| | Parts by weight |
|---|---|
| Copolymer consisting of 84% by weight of vinyl chloride, 15% by weight of vinyl acetate and 1% by weight of maleic acid | 2.4 |
| Methyl ethyl ketone | 16.3 |
| Toluene | 1.3 |
| Pentaerythritol | 2.0 |

After the volatile solvent has competely evaporated from the primer coating applied to the sheet stock, the primed surface is then coated with a polyvinyl chloride plastisol composition consisting of 60 parts by weight of finely divided polyvinyl chloride and 40 parts by weight of dioctyl phthalate plasticizer. The coated sheet thus obtained is then baked for 15 minutes at a temperature of 170° C. to fuse the coating and is then baked for an additional 15 minutes at 190° C. to flow out the coating and bring it to maximum gloss. No discoloration or decomposition of the adherent primer undercoating is noted under these conditions.

Example 2

The surfaces of a zinc plate are coated with a primer of the following composition:

| | Parts by weight |
|---|---|
| Modified copolymer of Example 1 | 2.4 |
| Methyl ethyl ketone | 16.3 |
| Toluene | 1.3 |
| Polyvinyl alcohol (finely-divided) | 2.0 |

After complete evaporation of the solvent from the primer coating thus applied the undercoated zinc plate is then surface coated with the polyvinyl chloride plastisol composition of Example 1. After being baked for 15 minutes at a temperature of 170° C. followed by further baking for 15 minutes at 190° C. the polyvinyl chloride coating thus applied is converted to an attractive high gloss finish. No discoloration or decomposition of the adherent primer coating is observed as a result of this heating schedule which involves relatively elevated temperatures for an active metal surface.

Example 3

The surfaces of a scoured zinc sheet are first coated with the primer composition described in Example 2 and after the volatile solvents have completely evaporated, the coated sheet is then baked at 180° C. for 10 minutes. After cooling, the primed zinc sheet is then coated with a clear nitrocellulose base lacquer. The high-bake treatment utilized is found to leave the primer coating unaffected with respect to any apparent discoloration or decomposition.

We claim:
1. A method of coating zinc and zinc-alloy surfaces which comprises priming said zinc and zinc-alloy surfaces with a solution in a volatile solvent medium of a film-forming terpolymer of vinyl chloride, vinyl acetate and an ethylenically unsaturated aliphatic dicarboxylic acid, said terpolymer solution also containing from 20% to 200% by weight, based on the weight of said terpolymer, of a polyhydroxy compound having at least four available hydroxy groups and selected from the group consisting of polyvinyl alcohol, pentaerythritol and hydroxyethylcellulose, evaporating the volatile solvent medium to leave a primer coating of the polyhydroxy compound modified film-forming terpolymer on the zinc and zinc-alloy surface, coating the primed surface with a resin selected from the group consisting of polyvinyl chloride, chlorinated rubber, nitrocellulose and alkyd resins, and then baking.

2. A method of coating zinc and zinc-alloy surfaces which comprises priming said zinc and zinc-alloy surfaces with a solution in a volatile solvent medium of a film-forming terpolymer of vinyl chloride, vinyl acetate and maleic acid, said terpolymer solution also containing from 20% to 200% by weight, based on the weight of said terpolymer, a polyhydroxy compound having at least four available hydroxy groups and selected from the group consisting of polyvinyl alcohol, pentaerythritol and hydroxyethylcellulose, evaporating the volatile solvent medium to leave a primer coating of the polyhydroxy compound modified film-forming terpolymer on the zinc and zinc-alloy surface, coating the primed surface with a resin selected from the group consisting of polyvinyl chloride, chlorinated rubber, nitrocellulose and alkyd resins, and then baking.

3. A method of coating a metal surface which comprises priming said metal surface with a primer consisting essentially of a volatile solvent solution of a terpolymer of vinyl chloride, vinyl acetate and an ethylenically unsaturated aliphatic dicarboxylic acid and from 20% to 200% by weight, based on the weight of said terpolymer, of a polyhydroxy compound containing at least four hydroxy groups and selected from the group consisting of polyvinyl alcohol, pentaerythritol and hydroxyethylcellulose, evaporating the volatile solvent to leave said primer coating on said surface coating the primed surface with a film-forming resin, and then baking.

4. The method of claim 3, wherein said film-forming resin coating also contains a polyhydroxy compound containing at least four hydroxy groups selected from the group consisting of polyvinyl alcohol, pentaerythritol and hydroxyethylcellulose.

5. The method of claim 3, wherein said metal surface comprises zinc.

6. The method of claim 3, wherein said solvent solution contains about 85% by weight of said polyhydroxy compound, based on the weight of said terpolymer.

References Cited by the Examiner
UNITED STATES PATENTS

| | | | |
|---|---|---|---|
| 2,329,456 | 9/1943 | Campbell | 260—78.5 |
| 2,764,313 | 9/1956 | Foley et al. | 117—75 |
| 2,891,876 | 6/1959 | Brown et al. | 117—75 |
| 2,913,430 | 11/1959 | Roeser | 260—32.8 |

ALFRED L. LEAVITT, *Primary Examiner.*

RICHARD D. NEVIUS, *Examiner.*

A. H. ROSENSTEIN, *Assistant Examiner.*